(12) United States Patent
Heuer et al.

(10) Patent No.: US 8,470,934 B2
(45) Date of Patent: Jun. 25, 2013

(54) POLYCARBONATE COMPOSITIONS HAVING IMPROVED SURFACE HARDNESS

(75) Inventors: Helmut-Werner Heuer, Krefeld (DE); Rolf Wehrmann, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 75 days.

(21) Appl. No.: 12/965,320

(22) Filed: Feb. 28, 2011

(65) Prior Publication Data

US 2011/0144284 A1 Jun. 16, 2011

(30) Foreign Application Priority Data

Dec. 12, 2009 (EP) .................................... 09015397

(51) Int. Cl.
*C08G 64/00* (2006.01)
*C08G 63/02* (2006.01)

(52) U.S. Cl.
USPC ......................................................... 525/394

(58) Field of Classification Search
USPC .................................. 525/394, 462; 528/201
See application file for complete search history.

(56) References Cited

U.S. PATENT DOCUMENTS 7,528,212 B2 * 5/2009 Mullen ......................... 528/190

* cited by examiner

*Primary Examiner* — Terressa Boykin
(74) *Attorney, Agent, or Firm* — Novak Druce Connolly Bove + Quigg LLP

(57) ABSTRACT

The present invention relates to polycarbonate compositions having improved surface hardness, processes for the preparation thereof and the use thereof for the production of blends, shaped articles and extrudates.

12 Claims, No Drawings

POLYCARBONATE COMPOSITIONS HAVING IMPROVED SURFACE HARDNESS

RELATED APPLICATIONS

This application claims benefit to European Patent Application No. 09 015 397.4, filed Dec. 12, 2009, which is incorporated herein by reference in its entirety for all useful purposes.

BACKGROUND OF THE INVENTION

The present invention relates to polycarbonate compositions having improved surface hardness, processes for the preparation thereof and the use thereof for the production of shaped articles and extrudates.

Aromatic polycarbonates belong to the group consisting of the industrial thermoplastics. They are distinguished by the combination of the technologically important properties of transparency, heat distortion resistance and toughness.

WO 2007/008390 A2 describes copolycarbonates which contain 1,1-bis(3-methyl-4-hydroxyphenyl)cyclohexane and optionally 2,2-bis(3-methyl-4-hydroxyphenyl)propane. It is disclosed that windows and other articles comprising this copolycarbonate have particularly good scratch resistance.

WO 2008/008 599 A2 describes the use of polycarbonates which may contain 2,2-bis(3-methyl-4-hydroxyphenyl)propane and/or 1,1-bis(3-methyl-4-hydroxyphenyl)cyclohexane for the production of flameproofed articles which, with a scratching force of 8 newton, have a scratch depth of less than 20 microns.

Diphenols containing rigid ring bridges in the molecule were described in DE 13 00 267 A. The preparation of linear polycarbonates from these diphenols is also mentioned herein. However, only homopolycarbonates are prepared in the examples. Thus, for example, the diphenol 4,4''-(2-norbornylidene)diphenol, which contains a saturated bicyclic, bridged hydrocarbon ring, is described here. In the document, the object is to provide polycarbonates having improved high-temperature properties. The homopolycarbonates described are said to have a better heat distortion resistance (high glass transition temperature) and solubility in volatile solvents. This is seen as an advantage according to the invention since articles such as films can be obtained therewith, which can be obtained by film casting, or polymer strands can be obtained therefrom by wet or dry spinning from organic solution. U.S. Pat. No. 3,517,071 A, which belongs to the same patent family, also discloses only homopolycarbonates in the examples. For increasing the scratch resistance of the surface hardness of polycarbonate compositions which contain corresponding structural elements in a blend component, the patent provides no teaching with regard to action.

The polycarbonate compositions known from the prior art are, however, not suitable for certain applications in which thermal stability and scratch resistance play an overriding role.

There is therefore the need for a polycarbonate composition which is stable at high temperatures and has increased scratch resistance in combination with the properties which otherwise are equally good.

In the context of this application, polycarbonate compositions (or blends) are understood as meaning mixtures of two or more polycarbonates and optionally provided with additives or polycarbonates with other thermoplastics.

It was therefore the object of the present invention to provide polycarbonate compositions and processes for the preparation thereof, which have a particularly high surface hardness, and polycarbonate compositions for applications in which particular requirements regarding the stability of the surface are set, without having to apply an additional scratch-resistant layer.

EMBODIMENTS OF THE INVENTION

An embodiment of the present invention is a polycarbonate composition comprising:
A) from 10 to 90 parts by weight, based on the sum of the parts by weight of the components A and B, of a polycarbonate comprising one or more monomer units of formulae (1a), (1b), and (1c),

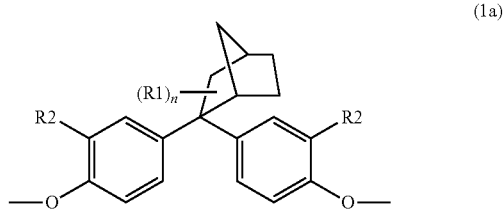

(1a)

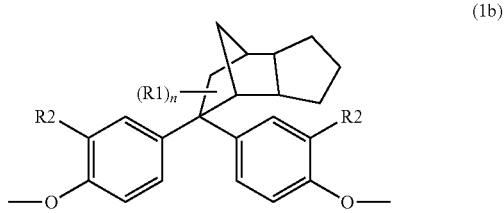

(1b)

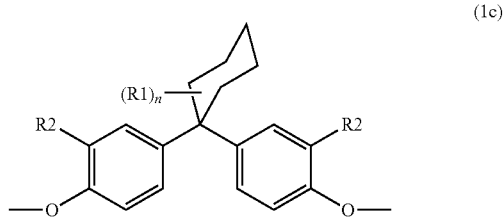

(1c)

wherein
R1 is, independently of one another, $C_1$-$C_4$-alkyl,
n is 0, 1, 2, or 3 for formulae (1a) and (1b) and 3, 4, 5, or 6 for formula (1c), and
R2 is, independently of one another, H, or linear or branched $C_1$-$C_{10}$ alkyl,
B) from 90 to 10 parts by weight, based on the sum of the parts by weight of the components A and B, of a polycarbonate comprising one or more monomer units derived from compounds of formula (4):

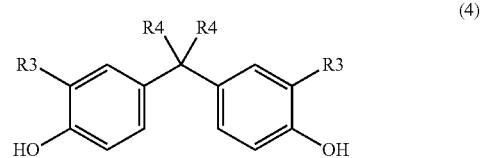

(4)

wherein
R3 is H, or linear or branched $C_1$-$C_{10}$ alkyl, and
R4 is linear or branched $C_1$-$C_{10}$ alkyl.

Another embodiment of the present invention is the above polycarbonate composition, wherein R2 and R3 are, independently of one another, H or methyl.

Another embodiment of the present invention is the above polycarbonate composition, wherein at least one of components A or B further comprise monomer units based on diphenols of formula (3a)

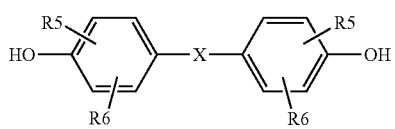
(3a)

wherein

R5 and R6 are, independently of one another, hydrogen, $C_1$-$C_{18}$-alkyl, $C_1$-$C_{18}$-alkoxy, halogen, or optionally substituted aryl or aralkyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene, wherein said $C_1$- to $C_6$-alkylene, $C_2$- to $C_5$-alkylidene or $C_5$- to $C_6$-cycloalkylidene are optionally substituted with $C_1$- to $C_6$-alkyl, or $C_6$-$C_{12}$-arylene which may optionally be condensed with further aromatic rings containing heteroatoms.

Another embodiment of the present invention is the above polycarbonate composition, wherein said polycarbonate composition comprises from 20 to 80 parts by weight of component A and from 80 to 20 parts by weight of component B, based in each case on the sum of the parts by weight of the components A and B.

Another embodiment of the present invention is the above polycarbonate composition, wherein said polycarbonate composition comprises from 25 to 65 parts by weight of component A and from 75 to 35 parts by weight of component B, based in each case on the sum of the parts by weight of the components A and B.

Another embodiment of the present invention is the above polycarbonate composition, wherein component A comprises one or more monomer units derived from compounds of formulae (2d) to (2i).

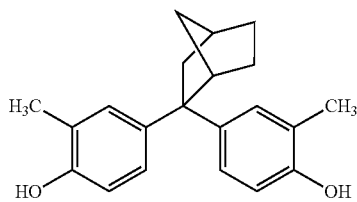
(2d)

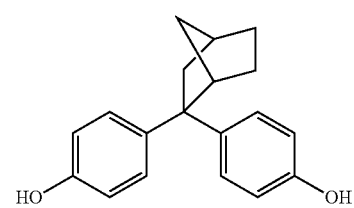
(2e)

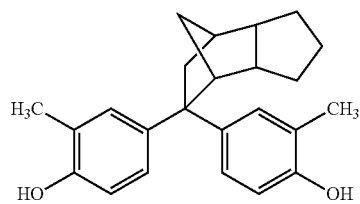
(2f)

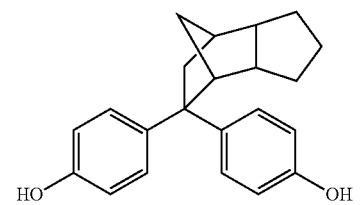
(2g)

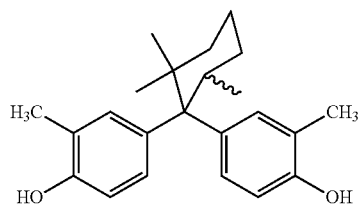
(2h)

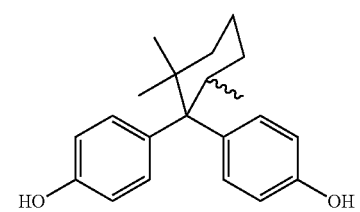
(2i)

Another embodiment of the present invention is the above polycarbonate composition, wherein component A comprises monomer units derived from compounds of formulae (3c) and (3d)

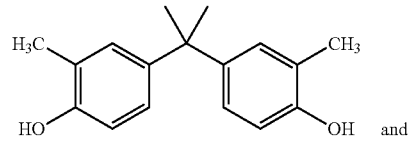
(3c)

and

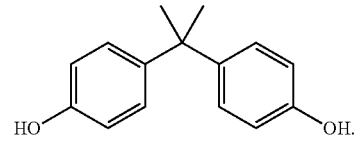
(3d)

Another embodiment of the present invention is the above polycarbonate composition, further comprising from 0 to 5 parts by weight, based on the sum of the parts by weight of the components A and B, of additives.

Yet another embodiment of the present invention is a shaped article, extrudate, film, or film laminate obtained from the above polycarbonate composition.

Yet another embodiment of the present invention is a shaped article, extrudate, or film comprising coextrusion layers obtained from the above polycarbonate composition, wherein said polycarbonate is a copolycarbonate.

Another embodiment of the present invention is the above shaped article, extrudate, film, or film laminate, wherein said shaped article, extrudate, film, or film laminate is a keypad in an electrical or electronic device, a lense, a screen/display cover, or an LED application.

Yet another embodiment of the present invention is a process for the preparing the polycarbonate composition of claim 1 comprising the step of compounding a polycarbonate via the interfacial process or melt transesterification process, wherein said polycarbonate comprises monomer units of formulae (1a), (1b) or (1c).

DESCRIPTION OF THE INVENTION

Surprisingly, it was found that polycarbonate compositions comprising a polycarbonate component based on diphenols which have a rigid ring bridge via a bi- or tricyclic aliphatic structural unit or an at least trisubstituted cycloalkyl ring in the molecule and a further polycarbonate component have an even higher surface hardness than the copolycarbonates known to date and having high scratch resistance.

The present invention therefore relates to polycarbonate compositions containing:

A) 10-90 parts by weight, preferably 20-80 parts by weight, particularly preferably 25-65 parts by weight (based on the sum of the parts by weight of the components A+B) of a polycarbonate containing one or more monomer units derived from compounds of the general formulae (1a), (1b) and (1c),

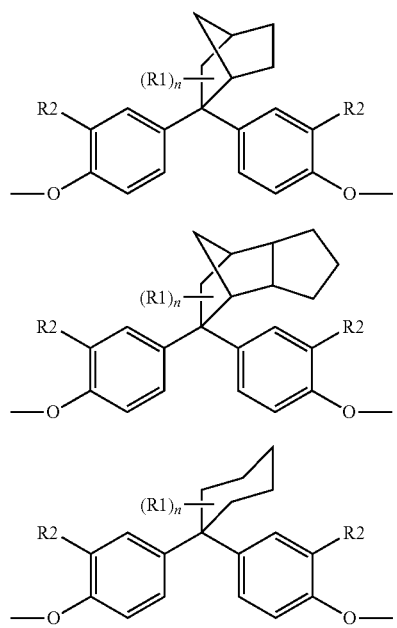

in which the R1, independently of one another, represent $C_1$-$C_4$-alkyl, preferably methyl, ethyl, n-propyl, isopropyl, tert-butyl, very particularly preferably methyl, n represents 0, 1, 2 or 3 for the structures (1a) and (1b) or
n represents 3, 4, 5 or 6 for the structure (1c)

and the R2, independently of one another, represent H, linear or branched $C_1$-$C_{10}$ alkyl, preferably linear or branched $C_1$-$C_6$ alkyl, particularly preferably linear or branched $C_1$-$C_4$ alkyl, in particular methyl, ethyl, n-propyl, isopropyl, tert-butyl, and very particularly preferably hydrogen or methyl.

B) 90-10 parts by weight, preferably 80-20 parts by weight, particularly preferably 75-35 parts by weight (based on the sum of the parts by weight of the components A+B) of a polycarbonate containing one or more monomer units derived from compounds of the general formula (4):

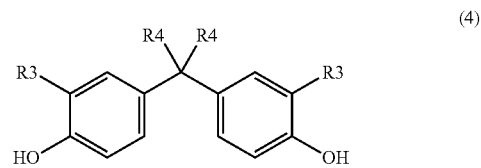

in which R3 represents H, linear or branched $C_1$-$C_{10}$ alkyl, preferably linear or branched $C_1$-$C_6$ alkyl, particularly preferably linear or branched $C_1$-$C_4$ alkyl, very particularly preferably H or $C_1$-alkyl (methyl)

and in which R4 represents linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl).

C) optionally 0 to 5 parts by weight, preferably 0 to 2.5 parts by weight, particularly preferably 0 to 1 part by weight (based in each case on the sum of the parts by weight of the components A+B) of additives.

Component A

The monomer unit is introduced via the corresponding diphenols of the general formulae (2a), (2b) and (2c), in which the R1 and R2 have the meanings stated under the formulae (1a), (1b) and (1c).

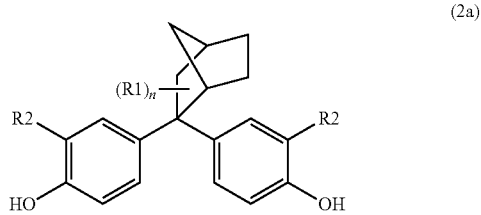

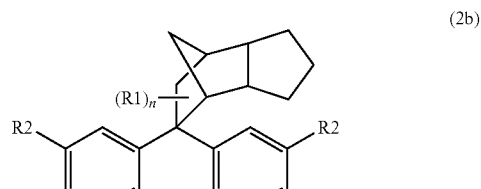

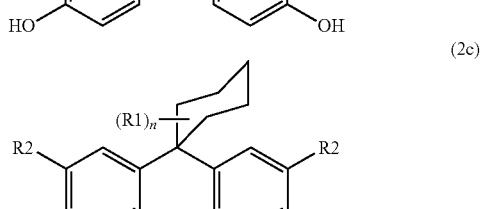

The compounds according to the invention which are described by the general formulae (2d) to (2i) are particularly preferred.

(2d)
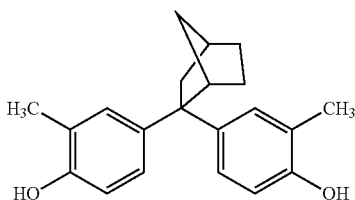

(2e)
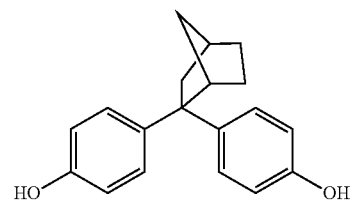

(2f)
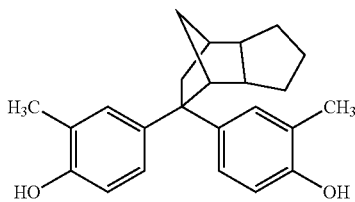

(2g)
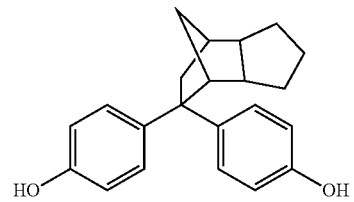

(2h)
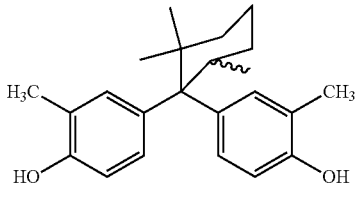

(2i)
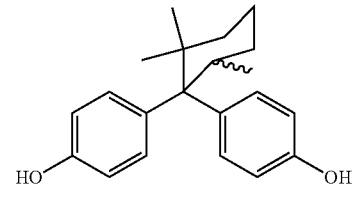

The compounds which are described by the formulae (2e), (2g), (2i) are very particularly preferred, the compound having the formula (2i) in the form of the bisphenol TMC in particular being very particularly preferred.

The diphenols of the formulae (2) which are to be used according to the invention and their use in homopolycarbonates are known in part in the literature. Copolycarbonates obtainable from these diphenols and the usability thereof for applications with required, relatively high surface hardness have however not been described to date.

In addition to one or more diphenols of the formulae (2), one or more diphenols selected from the group of compounds of the formula (3a) may be present as a further monomer unit:

(3a)
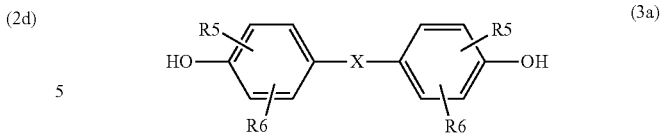

in which

R5 and R6, independently of one another, represent H, $C_1$-$C_{18}$-alkyl-, $C_1$-$C_{18}$-alkoxy, halogen, such as Cl or Br, or in each case optionally substituted aryl or aralkyl, preferably H or C1-C12-alkyl, particularly preferably H or C1-C8-alkyl and very particularly preferably H or methyl, and X represents a single bond, —$SO_2$—, —CO—, —O—, —S—, $C_1$- to $C_6$-alkylene, $C_2$- to $C_5$-alkylidene or $C_5$- to $C_6$-cycloalkylidene, which may be substituted by $C_1$- to $C_6$-alkyl, preferably methyl or ethyl, and furthermore represents $C_6$- to $C_{12}$-arylene, which may optionally be condensed with further aromatic rings containing heteroatoms.

Preferably, X represents a single bond, $C_1$ to $C_5$-alkylene, $C_2$ to $C_5$-alkylidene, $C_5$ to $C_6$-cycloalkylidene, —O—, —SO—, —CO—, —S—, —$SO_2$— or one a radical of the formula

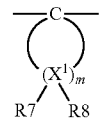

in which

R7 and R8, individually selectable for each $X^1$, independently of one another, denote hydrogen or $C_1$ to $C_6$-alkyl, preferably hydrogen, methyl or ethyl, and $X^1$ denotes carbon and m denotes an integer from 4 to 7, preferably 4 or 5, with the proviso that R7 and R8 are simultaneously alkyl on at least one atom $X^1$.

Hydroquinone, resorcinol, dihydroxybiphenyls, bis(hydroxyphenyl)alkanes, bis(hydroxyphenyl)cycloalkanes, bis(hydroxyphenyl) sulphides, bis(hydroxyphenyl)ethers, bis(hydroxyphenyl) ketones, bis(hydroxyphenyl) sulphones, bis(hydroxyphenyl) sulphoxides, α,α'-bis(hydroxyphenyl) diisopropylbenzenes and their compounds alkylated on the nucleus and halogenated on the nucleus, and also α,ω-bis(hydroxyphenyl)polysiloxanes, are mentioned by way of example for the diphenols of the formula (3a), which can be used in addition to the diphenols of the formula (1) according to the invention.

Preferred diphenols of the formula (3a) are, for example, 4,4'-dihydroxybiphenyl (DOD), 4,4'-dihydroxybiphenyl ether (DOD ether), 2,2-bis(4-hydroxyphenyl)propane (bisphenol A), 1,1-bis(4-hydroxyphenyl)-3,3,5-trimethylcyclohexane (bisphenol TMC), 1,1-bis(4-hydroxyphenyl)cyclohexane, 2,4-bis(4-hydroxyphenyl)-2-methylbutane, 1,1-bis(4-hydroxyphenyl)-1-phenylethane, 1,1-bis[2-(4-hydroxyphenyl)-2-propyl]benzene, 1,3-bis[2-(4-hydroxyphenyl)-2-propyl]benzene (bisphenol M), 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4- hydroxyphenyl)-2-methylbutane, 2,2-bis(3,5-dichloro-4-hydroxyphenyl)propane and 2,2-bis(3,5-dibromo-4-hydroxyphenyl)propane.

Particularly preferred diphenols are, for example, 2,2-bis(4-hydroxyphenyl)propane (bisphenol A), 4,4'-dihydroxybiphenyl (DOD), 4,4'-dihydroxybiphenyl ether (DOD ether), 1,3-bis[2-(4-hydroxyphenyl)-2-propyl]benzene (bisphenol M), 2,2-bis(3,5-dimethyl-4-hydroxyphenyl)propane, 1,1-bis(4-hydroxyphenyl)-1-phenylethane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

Compounds of the general formula (3b)

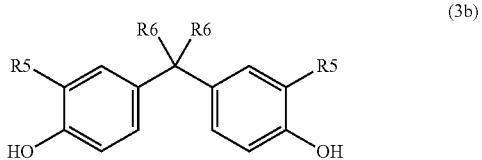

(3b)

in which R5 represents H, linear or branched $C_1$-$C_{10}$ alkyl, preferably linear or branched $C_1$-$C_6$-alkyl, particularly preferably linear or branched $C_1$-$C_4$ alkyl, very particularly preferably H or $C_1$-alkyl (methyl), and in which R6 represents linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl), are very particularly preferred.

In particular, the diphenols (3c) and (3d) are very particularly preferred here.

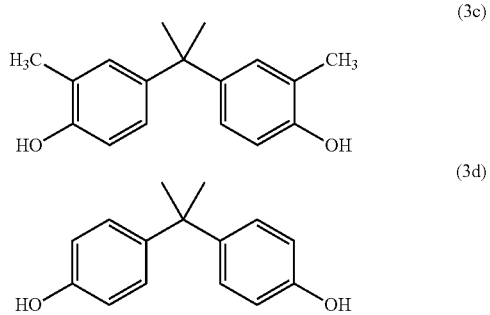

(3c)

(3d)

The diphenols of the general formulae (3) can be used both alone and as a mixture with one another. The diphenols are known from the literature or can be prepared by processes known from the literature (see, for example, H. J. Buysch et al., Ullmann's Encyclopedia of Industrial Chemistry, VCH, New York 1991, 5th Ed., Vol. 19, p. 348).

The proportion of the diphenols according to the invention in the copolycarbonate is 0.1-88 mol %, preferably 1-86 mol %, particularly preferably 5-84 mol % and very particularly preferably 10-82 mol % (based on the sum of the moles of diphenols used).

The preferred diphenolate units of the copolycarbonates according to the invention are derived from monomers having the general structures of the formulae (2) and (3) described above.

The copolycarbonate component of the polycarbonate compositions may be present as block and random copolycarbonate. Random copolycarbonates which contain diphenolate units which are derived from diphenols of the following formulae are particularly preferred:

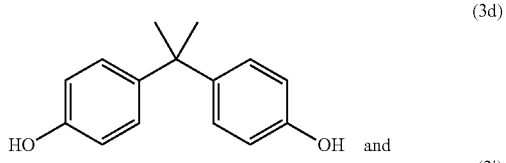

(3d)

and

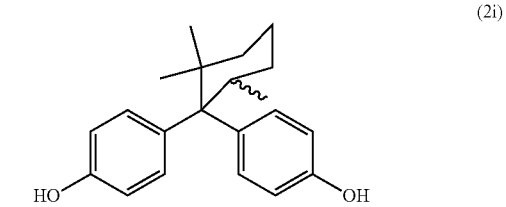

(2i)

Here, the ratio of the frequency of the diphenolate monomer units in the copolycarbonate is obtained from the molar ratio of the diphenols used.

Component B

Component B of the polycarbonate compositions is derived from the following diphenol units:

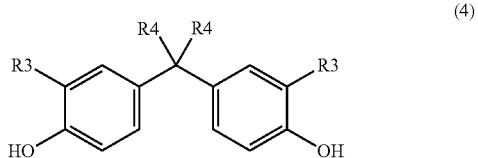

(4)

in which R3 represents H, linear or branched $C_1$-$C_{10}$ alkyl, preferably linear or branched $C_1$-$C_6$ alkyl, particularly preferably linear or branched $C_1$-$C_4$ alkyl, very particularly preferably H or $C_1$-alkyl (methyl), and in which R4 represents linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl).

Very particularly preferably, the component B of the polycarbonate compositions represents a homopolycarbonate of the diphenol (5).

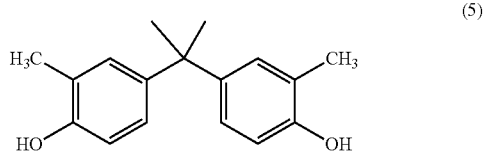 [SMILES: Cc1cc(C(C)(C)c2ccc(O)c(C)c2)ccc1O]

(5)

In addition to one or more diphenols of the formulae (4), one or more diphenols selected from the group of compounds of the formula (3a) may be present as a further monomer unit, as already described for component A.

The polycarbonates or the copolycarbonates may also be branched. For this purpose, certain small amounts, preferably amounts between 0.05 and 5 mol %, particularly preferably 0.1-3 mol %, very particularly preferably 0.1-2 mol %, based on the moles of diphenols used, of trifunctional compounds, such as, for example, isatinbiscresol (IBK) or phloroglucinol, 4,6-dimethyl-2,4,6-tri(4-hydroxyphenyl)hept-2-ene; 4,6-dimethyl-2,4,6-tri(4-hydroxyphenyl)heptane; 1,3,5-tri(4-hydroxyphenyl)benzene; 1,1,1-tri(4-hydroxyphenyl)ethane (THPE); tri(4-hydroxyphenyl)phenylmethane; 2,2-bis[4,4-bis(4-hydroxyphenyl)cyclohexyl]propane; 2,4-bis(4-hydroxyphenylisopropyl)phenol; 2,6-bis(2-hydroxy-5'-methylbenzyl)-4-methylphenol; 2-(4-hydroxyphenyl)-2-(2,4-dihydroxyphenyl)propane; hexa(4-(4-hydroxyphenylisopropyl)phenyl)orthoterephthalic acid ester; tetra(4-hydroxyphenyl)methane; tetra(4-(4-hydroxyphenylisopropyl)phenoxy)methane; α,α',α"-tris(4-hydroxyphenyl)-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxytriphenyl)methyl)benzene and in particular 1,1,1-tri(4-hydroxyphenyl)ethane (THPE) and bis(3-methyl-4-hydroxyphenyl)-2-oxo-2,3-dihydroindole, are used as so-called branching agents. Preferably, isatinbiscresol and 1,1,1-tri(4-hydroxyphenyl)ethane (THPE) and bis(3-methyl-4-hydroxyphenyl)-2-oxo-2,3-dihydroindole are used as branching agents.

By using these branching agents, branched structures result. The resulting long-chain branching generally leads to rheological properties of the polycarbonates obtained which manifest themselves in a structural viscosity compared with linear types.

For obtaining high molecular weight polycarbonates by the interfacial process, the alkali metal salts of diphenols are reacted with phosgene in the two-phase mixture. The molecular weight can be controlled by the amount of monophenols which act as chain terminators, such as, for example, phenol, tert-butylphenol or cumyl phenol, particularly preferably phenol, tert-butylphenol. In these reactions, virtually exclusively linear polymers form. This can be detected by end group analysis. By targeted use of so-called branching agents, as a rule polyhydroxylated compounds, branched polycarbonates are also obtained.

The present invention furthermore relates to a process for the preparation of the blend polycarbonate components according to the invention containing diphenolate units derived from diphenols of the formulae (2) and (3), characterized in that the diphenols and possibly branching agents are dissolved in aqueous alkaline solution and reacted with a carbonate source, such as phosgene, optionally dissolved in a solvent, in a two-phase mixture of an aqueous alkaline solution, an organic solvent and a catalyst, preferably an amine compound. The reaction procedure may also be effected in a plurality of stages.

Such processes for the preparation of polycarbonate are known in principle as interfacial processes, for example from H. Schnell, Chemistry and Physics of Polycarbonates, Polymer Reviews, Vol. 9, Interscience Publishers, New York 1964 page 33 et seq., and on Polymer Reviews, Vol. 10, "Condensation Polymers by Interfacial and Solution Methods", Paul W. Morgan, Interscience Publishers, New York 1965, Chapter VIII, page 325, and the underlying conditions are therefore familiar to the person skilled in the art.

The concentration of the diphenols in the aqueous alkaline solution is 2 to 25% by weight, preferably 2 to 20% by weight, particularly preferably 2 to 18% by weight and very particularly preferably 3 to 15% by weight. The aqueous alkaline solution consists of water, in which hydroxides of alkali metals or alkaline earth metals are dissolved. Sodium and potassium hydroxides are preferred.

With the use of phosgene as a carbonate source, the volume ratio of aqueous alkaline solution to organic solvent is 5:95 to 95:5, preferably 20:80 to 80:20, particularly preferably 30:70 to 70:30 and very particularly preferably 40:60 to 60:40. The molar ratio of diphenol to phosgene is less than 1:10, preferably less than 1:6, particularly preferably less than 1:4 and very particularly preferably less than 1:3. The concentration of the branched polycarbonates and copolycarbonates according to the invention in the organic phase is 1.0 to 25% by weight, preferably 2 to 20% by weight, particularly preferably 2 to 18% by weight and very particularly preferably 3 to 15% by weight.

The concentration of the amine compound, based on the amount of diphenol used, is 0.1 to 10 mol %, preferably 0.2 to 8 mol %, particularly preferably 0.3 to 6 mol % and very particularly preferably 0.4 to 5 mol %.

Diphenols are to be understood as meaning diphenol mixtures selected from the abovementioned compounds, having proportions of the abovementioned branching agents. The carbonate source is phosgene, diphosgene or triphosgene, preferably phosgene. If phosgene is used, a solvent can optionally be dispensed with and the phosgene passed directly into the reaction mixture.

Tertiary amines, such as triethylamine or N-alkylpiperidines, can be used as a catalyst. Suitable catalysts are trialkylamines and 4-(dimethylamino)pyridine. Triethylamine, tripropylamine, triisopropylamine, tributylamine, triisobutylamine, N-methylpiperidine, N-ethylpiperidine and N-propylpiperidine are particularly suitable.

Halogenated hydrocarbons, such as methylene chloride, chlorobenzene, dichlorobenzene, trichlorobenzene or mixtures thereof, or aromatic hydrocarbons, such as, for example, toluene or xylenes, are suitable as an organic solvent. The reaction temperature may be −5° C. to 100° C., preferably 0° C. to 80° C., particularly preferably 10° C. to 70° C. and very particularly preferably 10° C. to 60° C.

The preparation of the polycarbonates by the melt transesterification process, in which the diphenols are reacted with diaryl carbonates, generally diphenyl carbonate, in the presence of catalysts, such as alkali metal salts, ammonium or phosphonium compounds, in the melt, is also possible.

The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and DE-C 10 31 512.

In the melt transesterification process, the aromatic dihydroxy compounds already described in the case of the interfacial process are transesterified with carbonic acid diesters with the aid of suitable catalysts and optionally further additives in the melt.

Carbonic acid diesters in the context of the invention are those of formulae (6) and (7)

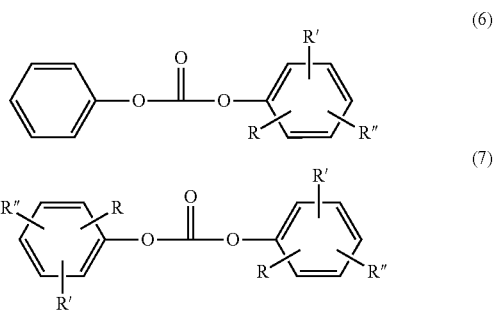

in which
R, R' and R", independently of one another, may represent H, optionally branched $C_1$-$C_{34}$alkyl/cycloalkyl, $C_7$-$C_{34}$-alkaryl or $C_6$-$C_{34}$-aryl, for example
diphenyl carbonate, butylphenyl phenyl carbonate, di-butylphenyl carbonate, isobutylphenyl phenyl carbonate, diisobutylphenyl carbonate, tert-butylphenyl phenyl carbonate, di-tert-butylphenyl carbonate, n-pentylphenyl phenyl carbonate, di(n-pentylphenyl) carbonate, n-hexylphenyl phenyl carbonate, di(n-hexylphenyl) carbonate, cyclohexylphenyl phenyl carbonate, di-cyclohexylphenyl carbonate, phenylphenol phenyl carbonate, diphenylphenol carbonate, isooctylphenyl phenyl carbonate, diisooctylphenyl carbonate, n-nonylphenyl phenyl carbonate, di(n-nonylphenyl) carbonate, cumylphenyl phenyl carbonate, dicumylphenyl carbonate, naphthylphenyl phenyl carbonate, dinaphthylphenyl carbonate, di-tert-butylphenyl phenyl carbonate, di(di-tert-butylphenyl) carbonate, dicumylphenyl phenyl carbonate, di(dicumylphenyl) carbonate, 4-phenoxyphenyl phenyl carbonate, di(4-phenoxyphenyl) carbonate, 3-pentadecylphenyl phenyl carbonate, di(3-pentadecylphenyl) carbonate, tritylphenyl phenyl carbonate, ditritylphenyl carbonate,
preferably diphenyl carbonate, tert-butylphenyl phenyl carbonate, di-tert-butylphenyl carbonate, phenylphenol phenyl carbonate, diphenylphenol carbonate, cumylphenyl phenyl carbonate, dicumylphenyl carbonate, particularly preferably diphenyl carbonate.

It is also possible to use mixtures of said carbonic acid diesters.

The proportion of carbonic acid esters is 100 to 130 mol %, preferably 103 to 120 mol %, particularly preferably 103 to 109 mol %, based on the dihydroxy compound.

In the context of the invention, basic catalysts, as described in the stated literature, such as, for example, alkali metal and alkaline earth metal hydroxides and oxides, but also ammonium or phosphonium salts, referred to below as onium salts, are used as catalysts in the melt transesterification process. Preferably onium salts, particularly preferably phosphonium salts, are used. Phosphonium salts in the context of the invention are those of the following general formula (8)

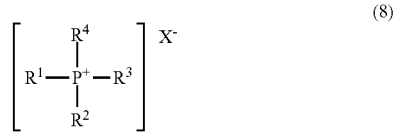

(8)

in which
$R^{1-4}$ may be the same or different $C_1$-$C_{10}$-alkyls, $C_6$-$C_{10}$-aryls, $C_7$-$C_{10}$-aralkyls or $C_5$-$C_6$-cycloalkyls, preferably methyl or $C_6$-$C_{14}$-aryls, particularly preferably methyl or phenyl, and $X^-$ may be an anion, such as hydroxide, sulphate, hydrogen sulphate, bicarbonate, carbonate, a halide, preferably chloride, or an alcoholate of the formula OR, it being possible for R to be $C_6$-$C_{14}$-aryl or $C_7$-$C_{12}$-aralkyl, preferably phenyl.

Preferred catalysts are
tetraphenylphosphonium chloride, tetraphenylphosphonium hydroxide, tetraphenylphosphonium phenolate, particularly preferably tetraphenylphosphonium phenolate.

The catalysts are preferably used in amounts of $10^{-8}$ to $10^{-3}$ mol, based on one mole of diphenol, particularly preferably in amounts of $10^{-7}$ to $10^{-4}$ mol.

Further catalysts may be used alone or optionally in addition to the onium salt in order to increase the rate of the polymerization. These include salts of alkali metals and alkaline earth metals, such as hydroxides, alkoxides and aryl oxides of lithium, sodium and potassium, preferably hydroxide, alkoxide or aryl oxide salts of sodium. Most preferred are sodium hydroxide and sodium phenolate. The amounts of the cocatalyst may be in the range from 1 to 200 ppb, preferably 5 to 150 ppb and most preferably 10 to 125 ppb, calculated in each case as sodium.

The transesterification reaction of the aromatic dihydroxy compound and of the carbonic acid diester in the melt is preferably carried out in two stages. In the first stage, the melting of the aromatic dihydroxy compound and of the carbonic acid diester takes place at temperatures of 80-250° C., preferably 100-230° C., particularly preferably 120-190° C., under atmospheric pressure in 0-5 hours, preferably 0.25-3 hours. After addition of the catalyst, the oligocarbonate is prepared from the aromatic dihydroxy compound and the carbonic acid diester by applying a vacuum (up to 2 mmHg) and increasing the temperature (up to 260° C.), by distilling off the monophenol. The main amount of vapours from the process occurs hereby. The oligocarbonate thus prepared has a weight average molar mass $M_w$ (as determined by measuring the relative solution viscosity in dichloromethane or in mixtures of equal amounts by weight of phenol/o-dichlorobenzene, calibrated by light scattering) in the range from 2000 g/mol to 18 000 g/mol, preferably from 4000 g/mol to 15 000 g/mol.

In the second stage, the polycarbonate is prepared during the polycondensation by further increasing the temperature to 250-320° C., preferably 270-295° C., and a pressure of <2 mm Hg. The remainder of vapours from the process is removed here.

The catalysts may also be used in combination (two or more) with one another.

For the use of alkali metal/alkaline earth metal catalysts, it may be advantageous to add the alkali metal/alkaline earth metal catalysts at a later time (for example after the oligocarbonate synthesis, during the polycondensation in the second stage).

The reaction of the aromatic dihydroxy compound and of the carbonic acid diester to give the polycarbonate can be carried out batchwise or preferably continuously in the process according to the invention, for example in stirred vessels, thin-film evaporators, falling-film evaporators, stirred vessel cascades, extruders, kneaders, simple disc reactors and high-viscosity disc reactors.

Analogously to the phase boundary process, branched poly- or copolycarbonates can be prepared by the use of polyfunctional compounds.

The relative solution viscosity of the copolycarbonates according to the invention, determined according to DIN 51562, is preferably in the range of =1.15-1.35.

Component C

Additives which may also be added to the compositions according to the invention are the additives customary for these thermoplastics, such as fillers, UV stabilizers, IR stabilizers, heat stabilizers, antistatic agents and pigments, colorants in the customary amounts; optionally, the demoulding behaviour, the flow behaviour and/or the flame retardance can also be improved by addition of external release agents, flow improvers and/or flameproofing agents (e.g. alkyl and aryl phosphites, phosphates, phosphanes, low molecular weight carboxylic acid esters, halogen compounds, salts, chalk, quartz powder, glass and carbon fibres, pigments and combination thereof. Such compounds are described, for example, in WO 99/55772, pages 15-25, and in "Plastics Additives", R. Gächter and H. Müller, Hanser Publishers 1983).

The release agents optionally added to the compositions according to the invention are preferably selected from the group which consists of pentaerythrityl tetrastearate, glyceryl monostearate, long-chain fatty acid esters, such as, for example, stearyl stearate and propanediol stearate, and mixtures thereof. The release agents are used in amounts of 0.05% by weight to 2.00% by weight, based on the moulding material, preferably in amounts of 0.1% by weight to 1.0% by weight, particularly preferably in amounts of 0.15% by weight to 0.60% by weight and very particularly preferably in amounts of 0.2% by weight to 0.5% by weight, based on the moulding material.

Suitable additives are described, for example, in "Additives for Plastics Handbook, John Murphy, Elsevier, Oxford 1999", in "Plastics Additives Handbook, Hans Zweifel, Hanser, Munich 2001".

Examples of suitable antioxidants or heat stabilizers are:

alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergistic agents, secondary antioxidants, is phosphites and phosphonites, benzofuranones and indolinones.

Organic phosphines (e.g. triphenylphosphine), phosphites, phosphonates and phosphates (e.g. triisooctyl phosphate, TOF), generally those in which the organic radicals consist completely or partly of optionally substituted aromatic radicals, are preferred.

Suitable complexing agents for heavy metals and for neutralization of traces of alkali metals are o/m-phosphoric acids, completely or partly esterified phosphates or phosphites.

Suitable light stabilizers (UV absorbers) are 2-(2'-hydroxyphenyl)benzotriazoles, 2-hydroxybenzophenones, esters of substituted and unsubstituted benzoic acids, acrylates, sterically hindered amines, oxamides and 2-(hydroxyphenyl)-1,3,5-triazines or substituted hydroxyalkoxyphenyl, 1,3,5-triazoles; substituted benzotriazoles, such as, for example, 2-(2'-hydroxy-5'-methylphenyl)benzotriazoles, 2-(2'-hydroxy-3',5'-di-tert-butylphenyl)benzotriazoles, 2-(2'-hydroxy-3'-tert-butyl-5'-methylphenyl)-5-chlorobenzotriazoles, 2-(2'-hydroxy-3',5'-tert-butylphenyl)-5-chlorobenzotriazoles, 2-(2'-hydroxy-5'-tert-octylphenyl)benzotriazoles, 2-(2'-hydroxy-3',5'-di-tert-amyl-phenyl)benzotriazoles, 2-[2'-hydroxy-3'-(3",4",5",6"-tetrahydrophthalimidoethyl)-5'-methylphenyl]benzotriazoles and 2,2'-methylenebis[4-(1,1,3,3-tetramethylbutyl)-6-(2H-benzotriazole-2-yl)phenol] are preferred.

Suitable UV stabilizers are furthermore selected from the group which consists of benzotriazoles (e.g. Tinuvins from BASF), triazines CGX-06 from BASF), benzophenones (Uvinuls from BASF), cyanoacrylates (Uvinuls from BASF), cinnamic acid esters and oxalanilides and mixtures of these UV stabilizers.

Examples of suitable UV absorbers are:
a) Malonic esters of the formula (1):

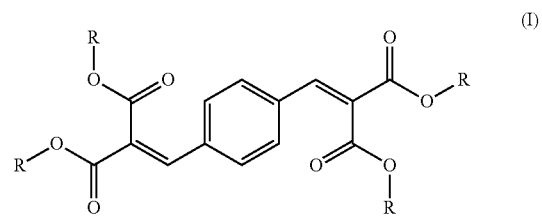

in which R denotes alkyl. R preferably represents $C_1$-$C_6$-alkyl, in particular $C_1$-$C_4$-alkyl and particularly preferably ethyl.

b) Benzotriazole derivatives according to formula (II):

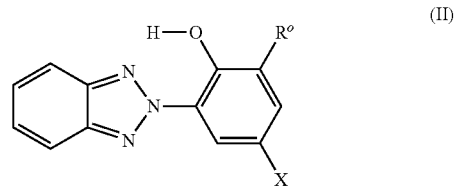

In formula (II), $R^o$ are present and X are identical or different and denote H or alkyl or alkylaryl.

Tinuvin® 329 where X=1,1,3,3-tetramethylbutyl and $R^o$=H, Tinuvin® 350 where X=tert-butyl and $R^o$=2-butyl and Tinuvin® 234 where X and $R^o$=1,1-dimethyl-1-phenyl are preferred.

c) Dimeric benzotriazole derivatives according to formula (III):

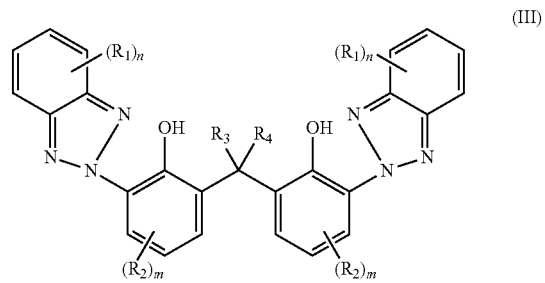

In formula (III), R1 and R2 are identical or different and denote H, halogen, C1-C10-alkyl, C5-C10-cycloalkyl, C7-C13-aralkyl, C6-C14-aryl, —OR5 or —(CO)—O—R5 where R5=H or $C_1$-$C_4$-alkyl.

In formula (III), R3 and R4 are likewise identical or different and denote H, $C_1$-$C_4$-alkyl, $C_5$-$C_6$-cycloalkyl, benzyl or $C_6$-$C_{14}$-aryl.

In formula (III), m denotes 1, 2 or 3 and n denotes 1, 2, 3 or 4.

Tinuvin® 360 where R1=R3=R4=H; n=4; R2=1,1,3,3-tetramethylbutyl; m=1 is preferred.

d) Dimeric benzotriazole derivatives according to formula (IV):

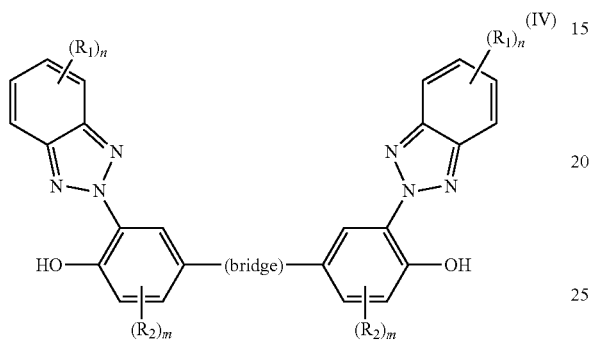

in which the bridge denotes

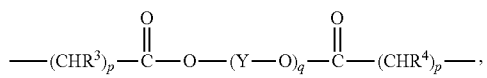

$R_1$, $R_2$, m and n have the meaning mentioned for formula (III), and in which p is an integer from 0 to 3, q is an integer from 1 to 10, Y is —$CH_2$—$CH_2$—, —$(CH_2)_3$—, —$(CH_2)_4$—, —$(CH_2)_5$—, —$(CH_2)_6$— or $CH(CH_3)$—$CH_2$— and R3 and R4 have the meaning mentioned for formula (III).

Tinuvin® 840 where R1=H; n=4; R2=tert-butyl; m=1; R2 is attached in the ortho-position to the OH group; R3=R4=H; p=2; Y=—$(CH_2)_5$—; q=1 is preferred.

e) Triazine derivatives according to formula (V):

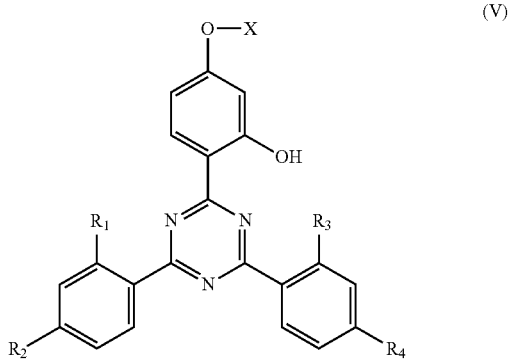

in which R1, R2, R3, R4 are identical or different and are H, alkyl, aryl, CN or halogen and X is alkyl, preferably isooctyl. Tinuvin® 1577 where R1=R2=R3=R4=H; X=hexyl and Cyasorb® UV-1 164 where R1=R2=R3=R4=methyl; X is octyl, is preferred.

f) Triazine derivatives of the following formula (Va):

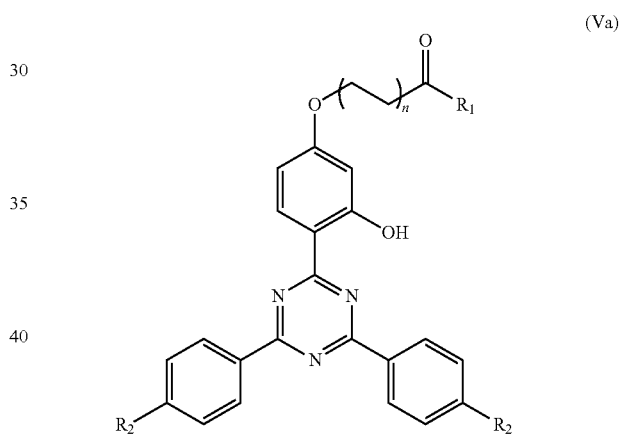

in which R1 denotes C1 alkyl to C17-alkyl, R2 denotes H or C1-alkyl to C4-alkyl and n is 0 to 20.

g) Dimeric triazine derivatives of the formula (VI):

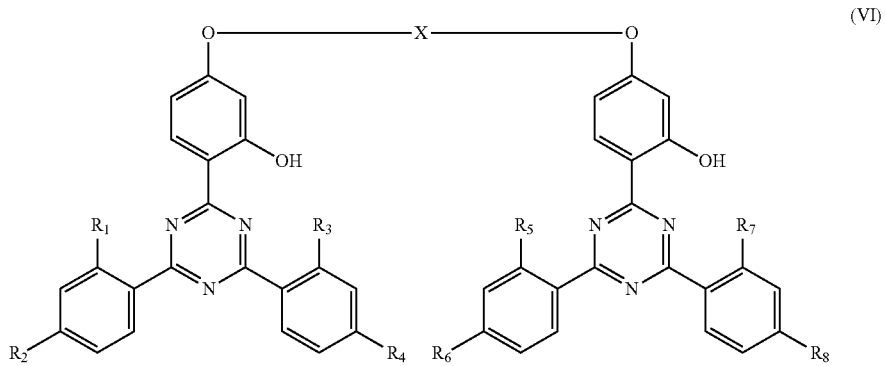

in which R1, R2, R3, R4, R5, R6, R7, R8 may be identical or different and denote H, alkyl, CN or halogen and X is alkylidene, preferably methylidene or —(CH2 CH2-O—)n-C (=O)— and n represents 1 to 10, preferably 1 to 5, in particular 1 to 3.

h) Diaryl cyanoacrylates of the formula (VII):

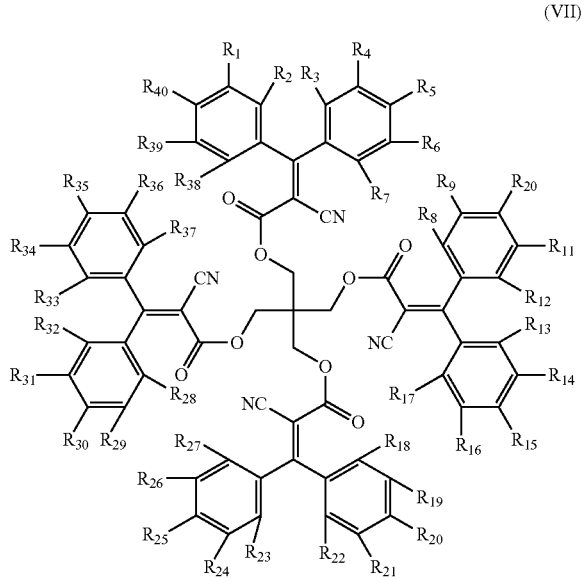

(VII)

in which R to R40 may be identical or different and denote H, alkyl, CN or halogen. Uvinul® 3030 where R1 to R40=H is preferred.

Particularly preferred UV stabilizers for the moulding materials according to the invention are compounds from the group which consists of the benzotriazoles (b) and dimeric benzotriazoles (c and d), the malonic esters (a) and the cyanoacrylates (h) and mixtures of these compounds.

The UV stabilizers are used in amounts of 0.01% by weight to 15.00% by weight, based on the moulding material, preferably in amounts of 0.05% by weight to 1.00% by weight, particularly preferably in amounts of 0.08% by weight to 0.5% by weight and very particularly preferably in amounts of 0.1% by weight to 0.4% by weight, based on the total composition.

Polypropylene glycols, alone or in combination with, for example, sulphones or sulphonamides, as stabilizers can be used to prevent damage by gamma rays.

These and other stabilizers can be used individually or in combination and are added in said forms to the polymer.

Suitable flame-retardant additives are phosphate esters, i.e. triphenyl phosphate, resorcinol diphosphoric acid ester, bromine-containing compounds, such as brominated phosphoric acid esters, brominated oligocarbonates and polycarbonates and preferably salts of fluorinated organic sulphonic acids.

Suitable tougheners are butadiene rubber with grafted-on styrene-acrylonitrile or methyl methacrylate, ethylene-propylene rubbers with grafted-on maleic anhydride, ethyl and butyl acrylate rubbers with grafted-on methyl methacrylate or styrene-acrylonitrile, interpenetrating siloxane and acrylate networks with grafted-on methyl methacrylate or styrene-acrylonitrile.

Furthermore, colorants, such as organic dyes or pigments or inorganic pigments, IR absorbers, may be added, individually, as a mixture or in combination with stabilizers, glass fibres, (hollow) glass spheres, inorganic fillers.

Embodiments which make use of parameters, compounds, definitions and explanations which are mentioned under preferably, particularly preferably or very particularly preferably, etc. are preferred, particularly preferred or very particularly preferred.

The general definitions, parameters, compounds and explanations mentioned in the description or definitions, parameters, compounds and explanations mentioned in preferred ranges can, however, also be combined with one another arbitrarily, i.e. between the respective ranges and preferred ranges.

The polycarbonate compositions according to the invention are preferably prepared by compounding, for example by means of a multiscrew extruder.

The thermoplastic moulding materials according to the invention are prepared by mixing the respective constituents in a known manner and compounding the melt at temperatures of 240° C. to 300° C. in customary units, such as internal kneaders, extruders and twin-screw apparatuses and extruding the melt.

The mixing of the individual constituents can be effected in a known manner, either successively or simultaneously.

The invention likewise relates to processes for the preparation of the moulding materials and the use of the moulding materials for the production of mouldings and to the shaped articles themselves.

The moulding materials according to the invention can be used for the production of mouldings of all kinds. These can be produced by injection moulding, extrusion and blow moulding processes. A further form of processing is the production of mouldings by thermoforming from previously produced sheets or films.

The polycarbonate compositions according to the invention, optionally as a mixture with other thermoplastics and/or customary additives, can be processed to give any desired mouldings/extrudates and used wherever already known polycarbonates, polyester carbonates and polyesters are used. Owing to their property profile, they are suitable in particular as materials for the injection moulding of relatively large shaped articles, for example car windscreens. Owing to the low water absorption and the associated improved dimensional stability, however, they are also suitable in particular as substrate materials for optical data stores, such as, for example, CD, CD-R, DVD, DVD-R, Blu-ray disc or Advanced Optical Disc (AOD), but can also be used, for example, as films in the electrical sector, as shaped articles in automotive construction and as sheets for covers in the safety area. Further possible applications of the polycarbonates according to the invention are:

1. Safety panes, which are known to be required in many areas of buildings, vehicles and aircraft, and as identification plates of helmets.
2. Production of films and film laminates.
3. Production of transparent sheets, in particular of multi-skin sheets, for example for covering buildings, such as railway stations, greenhouses and lighting systems.
4. Production of optical data stores.
5. For the production of traffic light housings or traffic signs.
6. As translucent plastics having a content of glass fibres for lighting purposes (cf. for example DE-A 1 554 020).
7. As translucent plastics having a content of barium sulphate, titanium dioxide and/or zirconium oxide or organic polymeric acrylate rubbers (EP-A 634 445, EP-A 269324) for the production of transparent and light-scattering shaped articles.

8. For the production of precision injection moulded parts, such as, for example, lenses, lens holders, collimators, waveguide elements and LED applications.
9. For the production of optical instrument parts, in particular photo and cine camera housings (cf. for example DE-A 2 701 173).
10. As electrical insulation materials for electrical conductors and for plug housings and connectors.
11. Production of mobile phone housings
12. Network interface devices
13. For the production of lights, e.g. headlamps, diffuser screens or inner lenses, and long-field lights.
14. For food applications, such as, for example, bottles, crockery and chocolate moulds.
15. For applications in the automotive sector, where contact with fuels and lubricants may occur, such as, for example, bumpers, optionally in the form of suitable blends with ABS or suitable rubbers.
16. For housings, such as, for example, electrical distributor cabinets.
17. Housings for electrical devices
18. Transparent washing machine portholes having improved scratch resistance
19. Safety goggles, visors and optical corrective glasses.
20. Lamp coverings for kitchen equipment having improved scratch resistance
21. Safety helmets having improved scratch resistance
22. For medical applications, medical devices, e.g. oxygenators, dialysers (hollow-fibre dialysers), 3-way valves, tube connectors, blood filters, injection systems, inhalers, ampoules
23. Films, for example for use in blood sugar measuring devices Particularly preferred applications are soft keys in electrical/electronic (E/E) applications, lenses (e.g. infrared lenses), LEDs, screen/display covers and films. The use of mouldings and extrudates comprising the polymers according to the invention in electronic applications, such as the use of the materials in keypads and housings, is particularly preferred. Mobile phones, computers and digital cameras constitute a preferred field of use.

The mouldings, extrudates and films and film laminates comprising the polymer compositions according to the invention are likewise subject matter of this application, as are shaped articles, extrudates and films containing coextrusion layers comprising the polymer compositions according to the invention.

The following examples are intended to illustrate the invention but without limiting it.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The polycarbonates were characterized by means of glass transition temperature Tg and the relative solution viscosity $\eta_{rel}$. The determination of the Tg was effected by means of dynamic differential thermal analysis (DSC) according to ISO 11357. The relative solution viscosity was determined in methylene chloride as a solvent at a concentration of 0.5 g/l and at a temperature of 25° C. using an Ubbelohde viscometer (DIN 51562).

Makrolon® M.3108 is a polycarbonate based on bisphenol A having an MVR of 6 cm$^3$/10 min at 300° C./1.2 kg (Bayer MaterialScience AG).

Apec® 1895 is a copolycarbonate based on bisphenol A and bisphenol TMC having an MVR of 18 cm$^3$/10 min at 330° C./2.16 kg (Bayer MaterialScience AG).

Example 1

Preparation of the Polycarbonate Component B 1150 ml of methylene chloride are added to a solution of 153.81 g (0.6 mol) of dimethylbisphenol A (2,2-bis(3,5-dimethyl-4-hydroxyphenyl)propane) of the structural formula (5), 3.24 g (0.0216 mol, 3.6 mol %, based on bisphenol) of p-tert-butylphenol (BUP) as a chain terminator and 55.2 g (1.38 mol) of sodium hydroxide in 1150 ml of water, which solution is rendered inert with nitrogen. At pH of 12.5-13.5 and 20° C., 64.5 g (0.9 mol) of phosgene are passed in. In order to prevent the pH from falling below 12.5, 30% strength sodium hydroxide solution was added during the phosgenation. After the end of the phosgenation and flushing with nitrogen, stirring is effected for a further 5 minutes and then 0.83 g (0.006 mol, 1 mol %, based on diphenols) of N-ethylpiperidine is added as a catalyst and stirring is effected for a further 1 hour. After the aqueous phase has been separated off, the organic phase is acidified with phosphoric acid and washed neutral and salt-free with eight 1000 ml portions of distilled water. The organic phase is separated off, dried over sodium sulphate and then evaporated down in a vacuum from a water jet pump at 80° C. and finally dried to constant mass at 130° C. in a vacuum from a water jet pump.

Transparent polycarbonate is obtained.

Examples 2 to 7

Compounds having improved surface hardness
The compounds prepared are shown in Table 1:
Measurement of the Surface Hardness:

The polycarbonate compositions are predried overnight at 120° C. in a drying oven. The polymer was then dissolved in methylene chloride and poured into small dishes having a diameter of 5 cm. The solvent was evaporated off and the remaining polymer body was once again dried overnight at 120° C. in a vacuum drying oven. After removal of the polymer from the small dish, circular sample discs having a diameter of 5 cm and a thickness of about 1-1.5 mm are obtained.

The measurement of the surface hardness is effected on small panels by means of an atomic force microscope AFM (Digital Instruments Nanoscope), the volume in each case mechanically removed from the sample surface by the production of a screen (indentation of the material) in μm$^3$ being obtained as measured variable and hence as a unit of measurement for the surface hardness, with specification of the penetration force of a diamond tip in a Nanoindent measuring head (from Hysitron) into the polymer surface (80 μN), the scanning speed of the tip (1 Hz) and the size of the measuring field (30×30 μm; in the form of a screen with 256 lines). The greater the volume, the softer is the material surface of the respective copolycarbonate. Smaller volume values therefore indicate an improved surface hardness. Measured values on copolycarbonates according to the invention and on the comparative example are shown in Table 1.

The examples, according to the invention, of the polycarbonate compositions from Examples 2 to 7 (cf. Table 1) have significantly lower volume values of the indentation than the comparative examples of a pure copolycarbonate based on bisphenol TMC and bisphenol A or of a homopolycarbonate based on bisphenol A. The polycarbonate compositions therefore have an improved surface hardness, which would not have been to expected by the person skilled in the art.

TABLE 1

| Composition | Example 2 | Example 3 | Example 4 | Example 5 | Example 6 | Example 7 |
|---|---|---|---|---|---|---|
| Polycarbonate component A Apec ® 1895 [%] | 40 | 45 | 50 | 55 | 60 | 70 |
| Polycarbonate component B from Example 1 [%] | 60 | 55 | 50 | 45 | 40 | 30 |
| Tg [° C.] | 130 | 134 | 135 | 143 | 139 | 149 |
| $\eta_{rel}$ | 1.242 | 1.235 | 1.241 | 1.240 | 1.238 | 1.243 |
| Volume of the indentation [μm³] | 35.1 | 36.2 | 37.7 | 38.0 | 37.9 | 58.1 |

| Polycarbonate | Comparative Example I Copolycarbonate Apec ® 1895 | Comparative Example II Makrolon ® M.3108 |
|---|---|---|
| Tg [° C.] | 183 | 149 |
| $\eta_{rel}$ | 1.235 | 1.31 |
| Volume of the indentation [μm³] | 92.0 | 113.0 |

The invention claimed is:

1. A polycarbonate compositions comprising:

A) from 10 to 90 parts by weight, based on the sum of the parts by weight of the components A and B, of a polycarbonate comprising one or more monomer units of formulae (1a), (1b), and (1c),

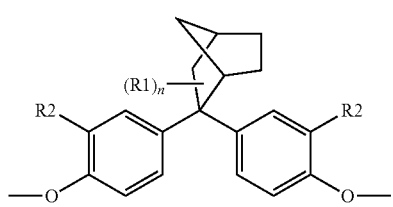
(1a)

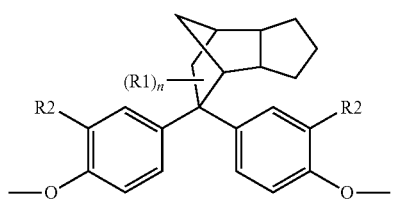
(1b)

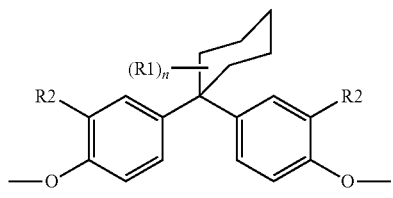
(1c)

wherein

R1 is, independently of one another, $C_1$-$C_4$-alkyl, n is 0, 1, 2, or 3 for formulae (1a) and (1b) and 3, 4, 5, or 6 for formula (1c), and R2 is, independently of one another, H, or linear or branched $C_1$-$C_{10}$ alkyl, B) from 90 to 10 parts by weight, based on the sum of the parts by weight of the components A and B, of a polycarbonate comprising one or more monomer units derived from compounds of formula (4):

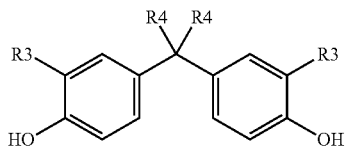
(4)

wherein

R3 is H, or linear or branched $C_1$-$C_{10}$ alkyl, and

R4 is linear or branched $C_1$-$C_{10}$ alkyl.

2. The polycarbonate composition of claim 1, wherein R2 and R3 are, independently of one another, H or methyl.

3. The polycarbonate composition of claim 1, wherein at least one of components A or B further comprise monomer units based on diphenols of formula (3a)

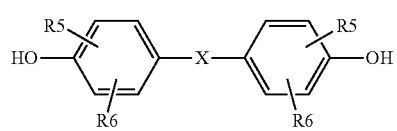
(3a)

wherein

R5 and R6 are, independently of one another, hydrogen, $C_1$-$C_{18}$-alkyl, $C_1$-$C_{18}$-alkoxy, halogen, or optionally substituted aryl or aralkyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene, wherein said $C_1$- to $C_6$-alkylene, $C_2$- to $C_5$-alkylidene or $C_5$- to $C_6$-cycloalkylidene are optionally substituted with $C_1$- to $C_6$-alkyl, or $C_6$-$C_{12}$-arylene which may optionally be condensed with further aromatic rings containing heteroatoms.

4. The polycarbonate composition of claim 1, wherein said polycarbonate composition comprises from 20 to 80 parts by weight of component A and from 80 to 20 parts by weight of component B, based in each case on the sum of the parts by weight of the components A and B.

5. The polycarbonate composition of claim 1, wherein said polycarbonate composition comprises from 25 to 65 parts by weight of component A and from 75 to 35 parts by weight of component B, based in each case on the sum of the parts by weight of the components A and B.

6. The polycarbonate composition of claim 1, wherein component A comprises one or more monomer units derived from compounds of formulae (2d) to (2i)

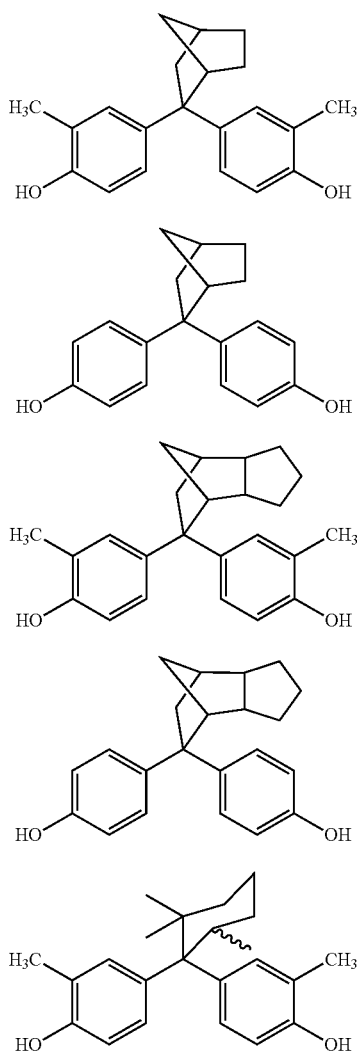

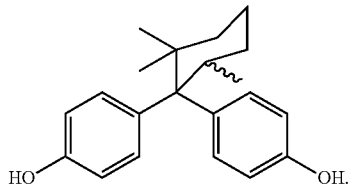

7. The polycarbonate composition of claim 1, wherein component A comprises monomer units derived from compounds of formulae (3c) and (3d)

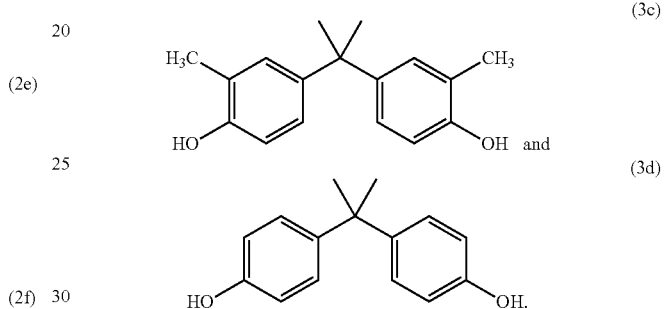

8. The polycarbonate composition of claim 1, further comprising from 0 to 5 parts by weight, based on the sum of the parts by weight of the components A and B, of additives.

9. A shaped article, extrudate, film, or film laminate obtained from the polycarbonate composition of claim 1.

10. A shaped article, extrudate, or film comprising coextrusion layers obtained from the polycarbonate composition of claim 1, wherein said polycarbonate is a copolycarbonate.

11. The shaped article, extrudate, film, or film laminate of claim 8, wherein said shaped article, extrudate, film, or film laminate is a keypad in an electrical or electronic device, a lense, a screen/display cover, or an LED application.

12. A process for the preparing the polycarbonate composition of claim 1 comprising the step of compounding a polycarbonate via the interfacial process or melt transesterification process, wherein said polycarbonate comprises monomer units of formulae (1a), (1b) or (1c).

* * * * *